(12) United States Patent
Liao

(10) Patent No.: US 8,737,299 B2
(45) Date of Patent: May 27, 2014

(54) RESOURCE ALLOCATION OF UPLINK HARQ FEEDBACK CHANNEL FOR CARRIER AGGREGATION IN OFDMA SYSTEMS

(75) Inventor: Pei-Kai Liao, Nantou County (TW)

(73) Assignee: Mediatek Inc. (TW)

( * ) Notice: Subject to any disclaimer, the term of this patent is extended or adjusted under 35 U.S.C. 154(b) by 399 days.

(21) Appl. No.: 13/134,857

(22) Filed: Jun. 20, 2011

(65) Prior Publication Data

US 2011/0310819 A1 Dec. 22, 2011

Related U.S. Application Data

(60) Provisional application No. 61/356,081, filed on Jun. 18, 2010, provisional application No. 61/373,351, filed on Aug. 13, 2010, provisional application No. 61/390,064, filed on Oct. 5, 2010.

(51) Int. Cl.
*H04W 4/00* (2009.01)
*H04L 5/00* (2006.01)

(52) U.S. Cl.
CPC .................................. *H04L 5/0055* (2013.01)
USPC .......................................... 370/328; 370/431

(58) Field of Classification Search
None
See application file for complete search history.

(56) References Cited

U.S. PATENT DOCUMENTS

| | | | |
|---|---|---|---|
| 7,864,738 B2 | 1/2011 | Kaikkonen et al. | 370/334 |
| 8,625,509 B2 * | 1/2014 | Ahn et al. | 370/329 |
| 2009/0109912 A1 | 4/2009 | Digirolamo et al. | 370/329 |
| 2009/0143074 A1 | 6/2009 | Pelletier et al. | 455/452.2 |
| 2009/0232067 A1 * | 9/2009 | Pajukoski et al. | 370/329 |
| 2010/0040028 A1 * | 2/2010 | Maheshwari et al. | 370/336 |
| 2011/0268032 A1 | 11/2011 | Kim et al. | 370/328 |
| 2011/0280203 A1 * | 11/2011 | Han et al. | 370/329 |
| 2011/0299489 A1 | 12/2011 | Kim et al. | 370/329 |
| 2012/0207103 A1 | 8/2012 | Dai et al. | 370/329 |
| 2012/0300722 A1 * | 11/2012 | Kim et al. | 370/329 |
| 2012/0320782 A1 * | 12/2012 | Seo et al. | 370/252 |

FOREIGN PATENT DOCUMENTS

| | | |
|---|---|---|
| CN | 101399644 A | 4/2009 |
| CN | 101489255 A | 7/2009 |
| CN | 101594211 A | 12/2009 |
| CN | 101667900 A | 3/2010 |
| CN | 101714892 | 5/2010 |

(Continued)

OTHER PUBLICATIONS

SIPO, the Examination Report of Chinese patent application 201180001941.1 dated Apr. 26, 2013 (6 pages).

(Continued)

*Primary Examiner* — Kevin C Harper
(74) *Attorney, Agent, or Firm* — Zheng Jin

(57) ABSTRACT

An efficient uplink HARQ feedback channel resource allocation scheme is adopted for carrier aggregation in a multi-carrier LTE/LTE-A system. Two resource allocation schemes (e.g., explicit and hybrid) for HARQ ACK/NACK (A/N) are applied. Part of the resources is allocated based on explicit method via RRC configuration. Another part of the resources is allocated based on hybrid method via both RRC and implicit information carried by downlink schedulers. In an explicit method, the physical resource for A/N feedback information is determined based on a resource index in a DL scheduling grant. The DL grant corresponds to transport blocks over a configured CC. The resource index points to a physical resource from a set of candidate uplink A/N physical resources reserved for the CC. In an implicit method, the A/N physical resources are determined based on a logical address of the DL scheduling grant.

20 Claims, 11 Drawing Sheets

(56) References Cited

FOREIGN PATENT DOCUMENTS

| EP | 2352266 | 8/2011 |
|---|---|---|
| EP | 2472741 | 7/2012 |
| WO | WO2008041098 A2 | 4/2008 |
| WO | WO2009055662 A2 | 4/2009 |
| WO | WO2009154530 | 12/2009 |
| WO | WO2010044564 A2 | 4/2010 |
| WO | WO2010050754 | 5/2010 |
| WO | WO2010068069 | 6/2010 |
| WO | WO2011116365 | 9/2011 |
| WO | WO2012039570 | 3/2012 |

OTHER PUBLICATIONS

3GPP TSG-RAN WG1#61 R1-102611, Ericsson, ST-Ericsson, "PUCCH Design for Carrier Aggregation", Montreal, Canada, May 10-14, 2010 (5 pages).
EPO, Search Report of EP patent application 11795199 dated May 10, 2013 (7 pages).
EPO, Search Report of EP patent application 11795200 dated May 10, 2013 (15 pages).
3GPP TSG RAN1#61 R1-103157, Motorola, "Uplink ACK/NACK Transmission Format for Carrier Aggregation", Montreal, Canada, May 10-14, 2010.
3GPP TSG RAN1#60bis R1-102115, Motorola, "Uplink ACK/NACK for Carrier Aggregation", Beijing, China, Apr. 12-16, 2010.
3GPP TSG RAN WG1-Meeting #61 R1-103249, NTT DOCOMO, "Uplink ACK/NACK Resource Assignments for Carrier Aggregation", Montreal, Canada, May 10-14, 2010.
3GPP TSG RAN WG1 Meeting #61bis R1-102292, NTT DOCOMO "Uplink ACK/NACK Transmission Scheme for Carrier Aggregation", Beijing, China, Apr. 12-16, 2010.
3GPP TSG RAN1#60 R1-101468, Motorola "Uplink ACK/NACK for Carrier Aggregation", San Francisco, USA, Feb. 22-26, 2010.
3GPP TSG RAN WG1 Meeting#60 R1-101257, Panasonic, "Discussion on Format 2-Type UL ACK/NACK Transmission for Carrier Aggregation", San Francisco, USA, Feb. 22-26, 2010.
IEEE Communications Magazine 2010 vol. 48, No. 2, GuangXiang Yuan et al. "carrier Aggregation for LTE-Advanced Mobile Communication Systems", Feb. 1, 2010.
3GPP TSG RAN WG1 Meeting#62 R1-104543, Media Tek Inc. "PUCCH Format Switching for HARQ Feedback in Carrier Aggregation", Madrid, Spain, Aug. 23-27, 2010.
3GPP TSG RAN WG1#62 R1-104574, Samsung, "DTX Feedback for Carrier Aggregation", Madrid, Spain, Aug. 23-27, 2010.
GPP TSG RAN1#61bis R1-103934, Motorola "Uplink ACK/NACK Transmission format for Carrier Aggregation", Dresden, Germany, Jun. 28 to Jul. 2, 2010.
International Search Report and Written Opinion of International Search Authority for PCT/CN2011/075962 dated Oct. 13, 2011 (11 pages).
I International Search Report and Written Opinion of International Search Authority for PCT/CN2011/075953 dated Oct. 13, 2011 (9 pages).
JPO, Office Action for JP patent application 2013-513546 dated Dec. 24, 2013 (4 pages).
3GPP TSG RAN WG1 Meeting #60 R1-101394; ETRI; PUCCH ACK/NAK Resources for Carrier Aggregation; San Francisco, USA; Feb. 22-26, 2010 (3 pages).

* cited by examiner

| HARQ FORMAT | # OF HARQ BITS SUPPORTED (X) | POSSIBLE PUCCH FORMAT |
|---|---|---|
| NON-CA FORMAT | $X \leq 2$ | PUCCH FORMAT 1A/1B IN RELEASE 8/9 LTE |
| CA-S FORMAT | $2 < X \leq 4$ | PUCCH FORMAT 1B WITH CHANNEL SELECTION |
| CA-L FORMAT | $X > 2$ | PUCCH FORMAT 3 BASED ON DFT-S-OFDM |

FIG. 3

| HARQ FORMAT | # OF HARQ BITS SUPPORTED (X) | POSSIBLE PUCCH FORMAT |
|---|---|---|
| NON-CA FORMAT | $X \leq 4$ | PUCCH FORMAT 1A/1B IN RELEASE 8/9 LTE; OR PUCCH FORMAT 1B WITH CHANNEL SELECTION |
| CA-S FORMAT | $2 < X \leq 4$ | PUCCH FORMAT 1B WITH CHANNEL SELECTION USING CA MAPPING TABLE |
| CA-L FORMAT | $X > 4$ | PUCCH FORMAT 3 BASED ON DFT-S-OFDM |

FIG. 4

RESOURCE ALLOCATION OF UPLINK HARQ FEEDBACK CHANNEL FOR CARRIER AGGREGATION IN OFDMA SYSTEMS

CROSS REFERENCE TO RELATED APPLICATIONS

This application claims priority under 35 U.S.C. §119 from U.S. Provisional Application No. 61/356,081, entitled "Uplink HARQ Feedback Channel Design for Carrier Aggregation in OFDMA Systems," filed on Jun. 18, 2010; U.S. Provisional Application No. 61/373,351, entitled "Uplink HARQ Feedback Channel Design for Carrier Aggregation in OFDMA Systems," filed on Aug. 13, 2010; U.S. Provisional Application No. 61/390,064, entitled "Resource Allocation of Uplink HARQ Feedback Channel for Carrier Aggregation in TDD/FDD OFDMA Systems," filed on Oct. 5, 2010; the subject matter of which is incorporated herein by reference.

TECHNICAL FIELD

The disclosed embodiments relate generally to wireless network communications, and, more particularly, to uplink HARQ feedback channel design and resource allocation for carrier aggregation in OFDMA systems.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNBs) communicating with a plurality of mobile stations, referred as user equipments (UEs).

An LTE system uses hybrid automatic repeat request (HARQ) at its Physical (PHY) layer to enhance data transmission quality while the HARQ procedure is controlled by Medium Access Control (MAC) or higher layers. HARQ is an error correction mechanism combining forward error control (FEC) and automatic repeat request (ARQ). At the transmitter side, error detection bits are added to the transmission data. The receiver decodes the received bits and sends an acknowledgement (ACK) or negative acknowledgement (NACK) back to the transmitter based on whether the transmitted data can be decoded correctly. The receiver sends the ACK or NACK by setting the corresponding HARQ bit(s) over a reverse control channel. In particular, in the LTE system, upon receiving downlink data from an eNB, a UE can send HARQ feedback information to the eNB via a Physical Uplink Control Channel (PUCCH). The current PUCCH supports up to 4 bits HARQ feedback information. The HARQ process improves the system through output. However, issues arise for the existing HARQ feedback channel design with enhancements to the LTE system.

Enhancements to the LTE system (LTE-Advance system) are considered so that it can meet or exceed International Mobile Telecommunications Advanced (IMT-Advanced) fourth generation (4G) standard. One of the key enhancements is to support bandwidth up to 100 MHz and be backwards compatible with existing wireless network systems. Carrier aggregation (CA) is introduced to improve the system throughput. With carrier aggregation, the LTE-Advance system can support peak data rate in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

In a mobile network, the bandwidth requirement of a UE changes with the amount of data the UE is transmitting and receiving. Carrier aggregation allows the mobile network to use the bandwidth more efficiently. In particular, carrier aggregation allows asymmetric number of downlink and uplink component carriers for each UE. For example, a UE with multiple CC capability can be configured to have five DL component carriers and only one UL component carrier in Frequency Division Duplex (FDD) system; or five DL portions and only one UL portion in Time Division Duplex (TDD) system. Due to the asymmetric UL and DL CC configuration, the payload size of the uplink HARQ increases significantly. For example, if five DL component carriers are configured, up to 12 bits are needed to carry the HARQ feedback information for FDD, and up to 47 bits are needed for TDD. The current non-CA PUCCH channel format, however, only supports up to 4 bits for HARQ feedback information.

Therefore, at least one new PUCCH channel format is needed for the uplink HARQ information. To be backward compatible, the LTE system needs to support both the non-CA-format uplink HARQ and the new CA-format uplink HARQ. Furthermore, the non-CA-format HARQ has better resource utilization efficiency, while the CA-format HARQ is less efficient. Depending on the application scenario, it is thus desirable that the applied HARQ feedback channel format changes accordingly to achieve better resource utilization efficiency. However, the wireless link is not reliable and control messages and data may be lost during transmission. This will result in information mismatch among UEs and eNBs. Blind decoding at the eNB side introduces higher computation complexity and performance degradation. To solve the problem, a HARQ format synchronization scheme between UEs and eNBs is required. A predefined rule for HARQ format switching in both UEs and eNBs is needed.

Another issue for HARQ feedback channel design in an LTE-Advance system is the physical resource allocation for the uplink HARQ. Due to the asymmetrical UL and DL carrier components for an UE, there may be only one HARQ feedback channel on a specific UL component carrier for multiple scheduled transport blocks (TBs) in more than one DL CCs. Therefore, the current non-CA based implicit resource allocation, which depends on the logical address of the downlink scheduler, cannot be used. Implicit resource allocation will create multiple candidate resource locations for the feedback due to multiple DL schedulers in the same scheduling period (e.g., subframe in LTE). Due to unreliable decoding results of the DL schedulers, an eNB does not know which resource location a UE will apply and thus has to reserve all candidate resource allocations. A solution is sought to allocate resource for HARQ feedback channel more efficiently for CA mode.

SUMMARY

HARQ feedback channel design for carrier aggregation (CA) is proposed in a multi-carrier LTE/LTE-A system. In one novel aspect, a predefined rule for HARQ feedback channel format switching is adopted by the system. Different HARQ formats are supported: single component carrier (non-CA) mode, carrier aggregation with small payload size (CA- S) mode, carrier aggregation with large payload size (CA-L) mode, and fallback mode. From the various CA and non-CA formats, the format to be used for uplink HARQ feedback channel is determined based on the following factors: UE capability for the maximum number of CCs supported; CC configuration information by radio resource configuration (RRC) layer; and detection results of downlink schedulers. The CC configuration information may include the number of CCs that are configured by RRC, and a specific HARQ format to be used. Because the more reliable upper layer configuration is used to make the HARQ format-switching decision, the risk of UE and eNB mismatch is greatly reduced.

In another novel aspect, an efficient HARQ feedback channel resource allocation scheme is adopted by the system. Two resource allocation schemes (e.g., explicit and hybrid) for HARQ ACK/NACK (A/N) are applied. Part of the resources is allocated based on explicit method via RRC configuration. Another part of the resources is allocated based on hybrid method via both RRC and implicit information carried by downlink schedulers. In an explicit method, the physical resource for A/N feedback information is determined based on a resource index in a DL scheduling grant. The DL grant corresponds to transport blocks over a configured CC. The resource index points to a physical resource from a set of candidate uplink A/N physical resources reserved for the CC. If the DL transmission mode is configured as dual-codeword, then a second A/N physical resource is determined by applying an offset to the resource index. In an implicit method, the A/N physical resources are determined based on a logical address of the DL scheduling grant. In one embodiment, both implicit and explicit resource allocation is applied in a dynamic DL scheduling scheme. In another embodiment, explicit resource allocation is applied in a semi-persistent scheduling (SPS) DL scheduling scheme.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 shows the set of FDD HARQ formats, the range of the number of HARQ bits supported, and its possible mapping to existing or new PUCCH format.

FIG. 4 shows the set of TDD HARQ formats, the range of the number of HARQ bits supported, and its possible mapping to existing or new PUCCH format.

DETAILED DESCRIPTION

Reference will now be made in detail to some embodiments of the invention, examples of which are illustrated in the accompanying drawings.

Figure 1:
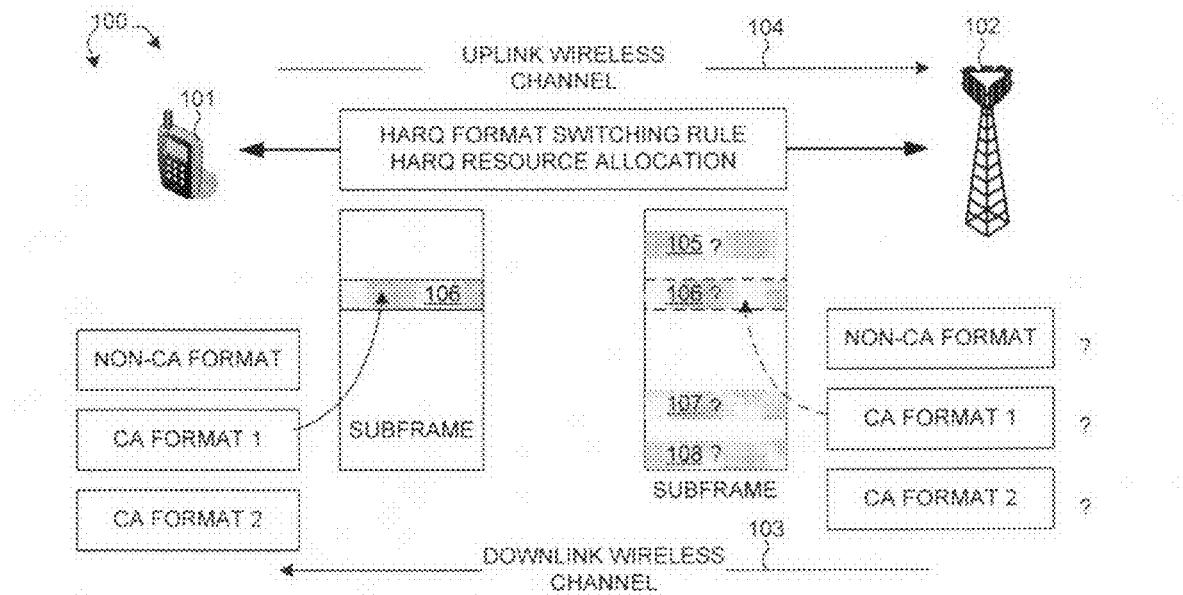
FIG. 1 illustrates hybrid automatic repeat request (HARQ) feedback channel design in an LTE-A system 100 in accordance with one novel aspect.

FIG. 1 illustrates hybrid automatic repeat request (HARQ) feedback channel design in an LTE-A system 100 in accordance with one novel aspect. LTE-A system 100 comprises a UE101 and an eNB102, both support carrier aggregation (CA) over multiple component carriers (CCs). In a downlink wireless channel 103, eNB102 transmits one or multiple downlink (DL) grants to UE101. In an uplink wireless channel 104, UE141 replies with uplink (UL) HARQ feedback information to eNB102. There are more than one formats in the system to support HARQ feedback channel for both non-CA and CA mode (e.g., non-CA format, CA format 1, and CA format 2). Due to the unreliability of the wireless channel, UE101 and eNB102 may have different understandings about which format is applied. In addition, because multiple DL component carriers are supported, there may be only one HARQ feedback channel on a specific UL CC for multiple scheduled transport blocks in more than one DL CCs. Due to unreliable decoding results of DL schedulers, eNB102 has no idea which resource location UE 101 will apply for the HARQ feedback channel (e.g., physical resource location 105-108). In one novel aspect, a HARQ format synchronization scheme between UE101 and eNB102 is defined. More specifically, a HARQ format-switching rule is pre-defined in both UE101 and eNB102. In another novel aspect, an efficient HARQ resource allocation scheme for CA mode is defined in both UE101 and eNB102.

Figure 2:
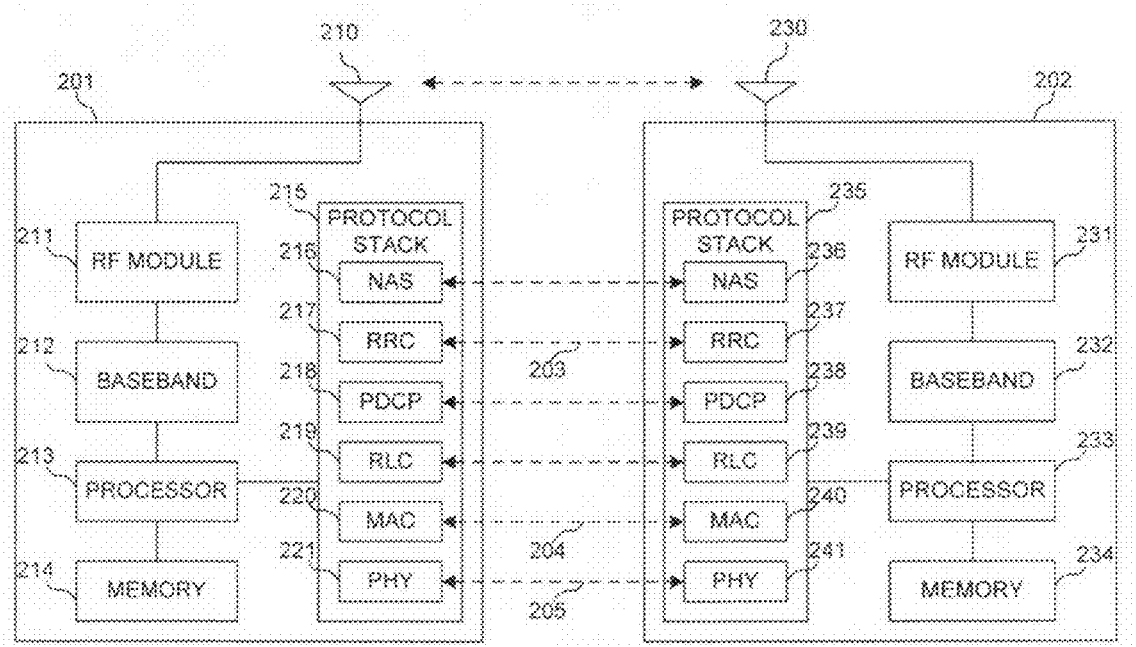
FIG. 2 illustrates an exemplary wireless communication system comprising a user terminal and a base station in accordance with one novel aspect.

FIG. 2 illustrates simplified block diagrams of an exemplary wireless communication terminal UE201 and base station eNB202. UE201 and eNB202 may operate following any communication protocol. For illustrative purposes, the disclosed embodiment operates according to the LTE protocol. UE201 comprises a transceiver antenna 210 coupled to RF Module 211. Transceiver antenna 210 receives or transmits RF signals. Although only one antenna is shown for UE201, it is known to the skilled in the art that wireless terminals may have multiple antennas for transmission and reception. RF Module 211 receives signals from either transceiver antenna 210 or baseband module 212, and converts the received signals to baseband frequency. The baseband module 212 processes the signals transmitted from or received by UE201. Such processing includes, for example, modulation/demodulation, channel coding/decoding, and source coding/decoding. UE201 further comprises processor 213 that processes digital signals and provides other control functionalities. Memory 214 stores program instructions and data to control the operations of UE201. Similarly, eNB202 comprises a transceiver antenna 230 coupled to RF module 231, a baseband module 232, a processor 233, and memory 234.

UE201 and eNB202 communicate with each other via a commonly defined layered protocol stack 215. The layered protocol stack 215 includes Non Access Stratum (NAS) layer 216, which is the protocol between an UE and a mobility management entity (MME) to provide upper layer network control, Radio Resource Control (RRC) layer 217, Packet Data Convergence Control (PDCP) layer 218, Radio Link Control (RLC) layer 219, Media Access Control (MAC) layer 220, and Physical Layer (PHY) 221. The different modules and protocol layer modules may be function modules or logical entities, and may be implemented by software, firmware, hardware, or any combination thereof. The different modules work together, when executed by the processor, allow UE201 and eNB202 to perform various communication activities.

In particular, the LTE system uses HARQ at the PHY layer to enhance data transmission quality (e.g., soft combining and feedback information via 205), while the HARQ procedure is controlled by MAC or higher layers (e.g., procedure for retransmission and feedback information via 204). Additional configuration information for HARQ feedback channel is controlled by upper layer (e.g., RRC 203). In the layered protocol of 215, the PHY layer data transmission and the MAC layer control messages are less reliable than the upper layer control messages such as the RRC layer messages. Due to the nature of the layered protocol, in one embodiment of the invention, the higher layer configuration information is used to synchronize the HARQ formats between UE201 and eNB202 and to allocate HARQ resource.

HARQ Format-Switching

As shown in FIG. 2, the HARQ information is exchanged at the MAC layer. The current LTE supports several channel formats for uplink HARQ feedback information transmission in PHY layer, up to a maximum of 4 bits. In LTE-A systems, the existing formats do not support enough HARQ information bits when multiple DL CCs are configured under carrier aggregation. New formats for HARQ feedback information are needed. To support more than two configured DL CCs, at least one new HARQ channel format is needed. FIG. 3 and FIG. 4 show, in one embodiment of the invention, a set of proposed HARQ channel formats for FDD and TDD respectively.

FIG. 3 shows, in one embodiment of the invention, for FDD, the set of HARQ formats, the range of the number of HARQ bits supported, and its possible mapping to existing or new PUCCH format. The FDD non-CA format supports less than or equal to two bits of HARQ in the uplink feedback information, and uses the LTE Release 8/9 PUCCH Format 1*a*/1*b*. The FDD carrier aggregation small payload (CA-S) format supports greater than two and less than or equal to four HARQ bits in the uplink feedback information, and takes the form of PUCCH Format 1*b* with channel selection. The FDD carrier aggregation large payload (CA-L) format supports greater than two bits of HARQ in the uplink feedback information, and takes the form of PUCCH Format 3 based on DFT-S-OFDM.

FIG. 4 shows, in one embodiment of the invention, the set of HARQ formats for TDD, the range of number of HARQ bits supported, and its possible mapping to existing or new PUCCH format. The TDD non-CA format supports less than or equal to four bits of HARQ in the uplink feedback information, and uses the LTE Release 8/9 PUCCH Format 1*a*/1*b* or PUCCH Format 1*b* with channel selection. The TDD carrier aggregation small payload (CA-S) format supports greater than two and less or equal to four HARQ bits in the uplink feedback information, and takes the form of PUCCH Format 1*b* with channel selection using CA mapping table. The TDD carrier aggregation large payload (CA-L) format supports greater than four bits of HARQ in the uplink feedback information, and takes the form of PUCCH Format 3 based on DFT-S-OFDM.

FIG. 3 and FIG. 4 are exemplary channel formats containing HARQ information to support carrier aggregation. Due to asymmetrical DL and UL CC configuration, new format of HARQ is required. The format with increased payload for the HARQ feedback information makes the system less efficient in uplink resource utilization. Therefore, UE and eNB should be able to switch the format based on the application scenario. Problems occur when the less reliable PHY or MAC layer control messages are lost or not received correctly. Such control messages includes DL grant messages that dynamically schedule data transmission for a CC, which is activated by MAC or higher layer. For example, an eNB sends three downlink grants to an UE. The eNB based on the three DL grants sent, expects HARQ feedback from the receiving UE in the format of CA-L as defined in FIG. 3 and FIG. 4. Since the PHY or MAC layer is a less reliable control message channel, the UE may receive two grants only. The UE analyzes the information and makes decision as to whether switching the uplink HARQ format is warranted. Since the UE only receives two DL grants, it finds out that the required HARQ bits is less than or equal to four. Therefore, UE sends uplink HARQ information using CA-S format. The format used by the UE, based on its received DL grant is different than the one the eNB sender is expecting. An HARQ format mismatch occurs between the eNB and the UE. To solve the problem, a predefined scheme to synchronize UE and eNB in uplink HARQ format switching is needed.

Figure 5:
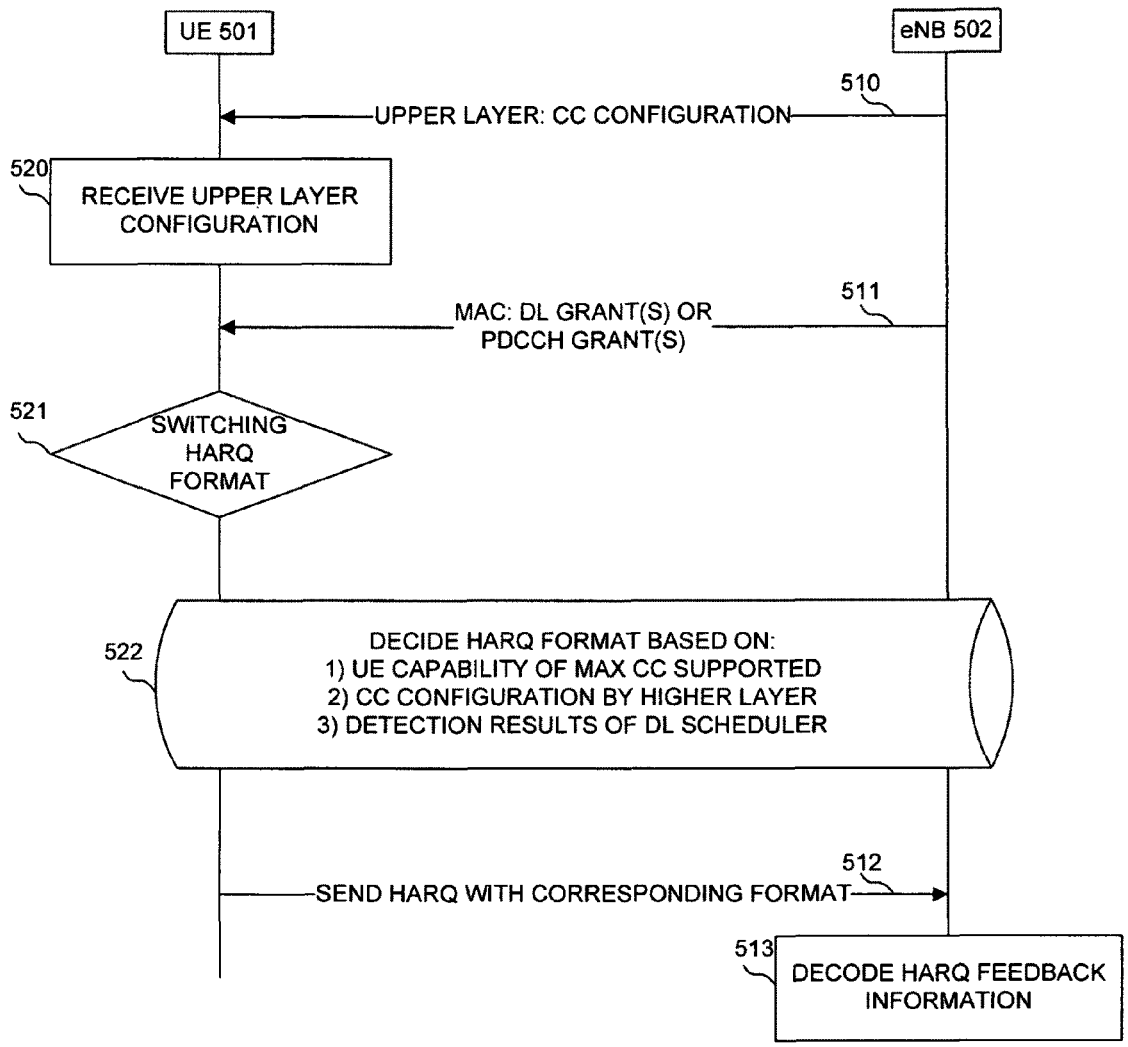
FIG. 5 illustrates a method to uplink HARQ format synchronization in accordance with one novel aspect.

FIG. 5 shows an embodiment of the invention that solves the mismatch problem. At step 510, eNB 502 sends semi-static CC Configuration data via an upper layer (e.g., RRC) control channel to UE 501. The CC configuration data may include the number of CCs that are configured by RRC, and a specific HARQ format to be used. This upper layer control channel is more reliable than the lower layer, such as PHY or MAC layer. At step 520, UE 501 receives this upper layer control message and uses it to make a decision on HARQ format. At step 511, eNB 502 sends a plurality of DL grants via either MAC layer or Physical Downlink Control Channel (PDCCH). Such DL grant(s) may also be lost due to the errors or losses in the unreliable lower layer control messages. Upon receiving the plurality of DL grants, at step 521, UE 501 determines whether HARQ format switching is required. In one embodiment of the invention, this decision is made at step 522 based on the following information: 1) UE 501's capability of maximum number of CC supported; 2) the CC configuration from upper layer received from eNB 502 at step 510; and 3) the detection results of DL scheduler at UE 501. At step 512, UE 501 sends HARQ feedback information with the corresponding format based on the decision made at step 522. Upon receiving the HARQ feedback information, eNB502 decodes the information using the corresponding format at step 513. Because the more reliable upper layer configuration is used to make the HARQ format-switching decision, the risk of UE and eNB mismatch is greatly reduced.

Figure 6:
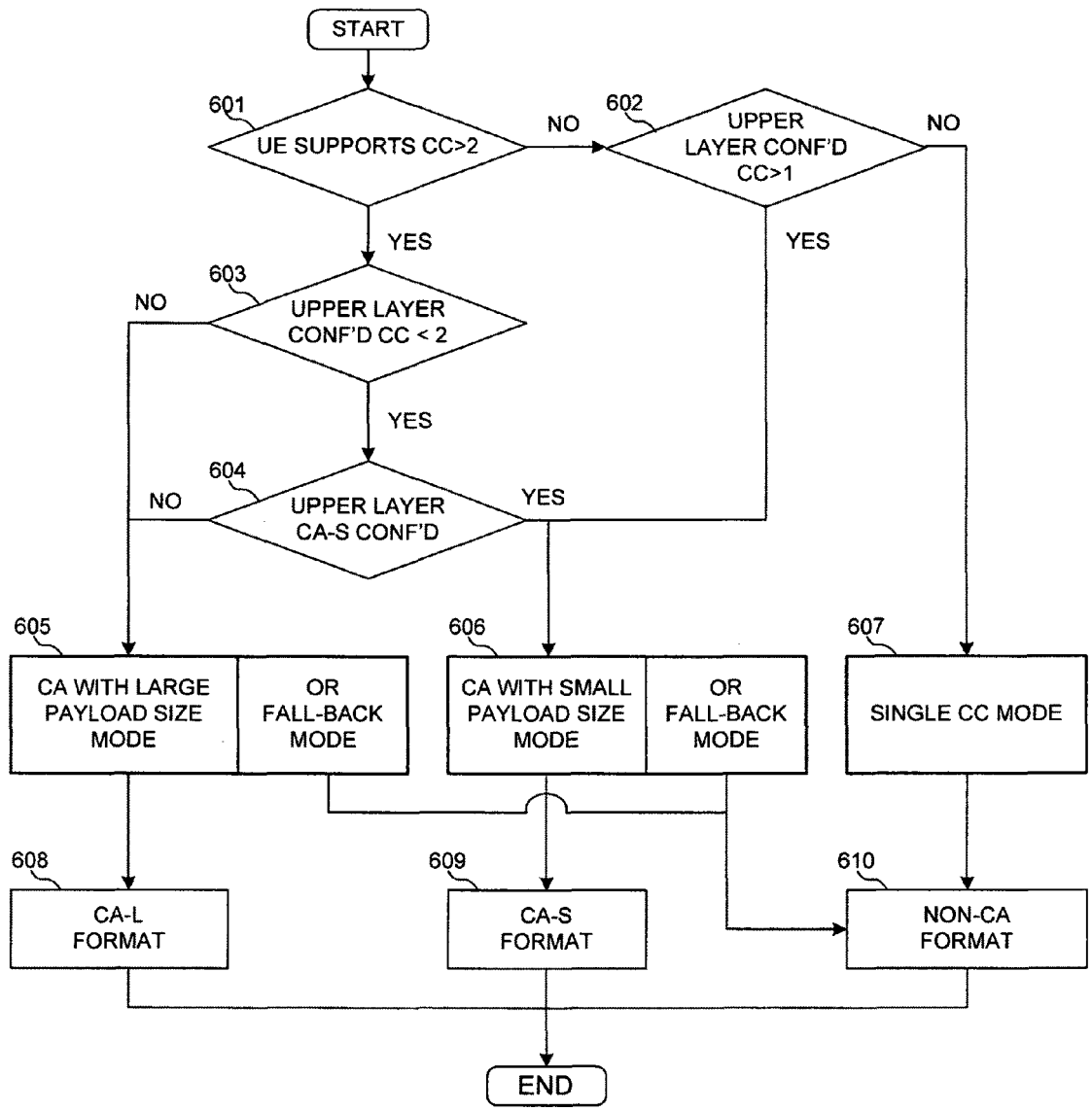
FIG. 6 illustrates a specific eNB implementation to solve the uplink HARQ format switching problem.

FIG. 6 shows one embodiment of eNB implementation of the algorithm in FIG. 5 in FDD system. For an UE supporting CA, at step 601, eNB first considers whether the UE has the capability of supporting more than two CCs. If no, at step 602, eNB further checks whether upper layer configures the UE with more than one CC. If no, eNB puts this UE in single CC mode 607, and uses non-CA format 610 for HARQ feedback. If yes, eNB will enter state 606: CA with small payload size mode or fallback mode. If fallback mode is triggered due to the detection of downlink scheduler for PCC only, then non- CA format 610 is used for uplink HARQ feedback; otherwise, CA with small payload size mode is triggered and CA-S format 609 is used for uplink HARQ feedback.

At step 601, if the eNB determines that the UE supports more than two CCs, then the eNB goes to step 603. At step 603, the eNB checks whether upper layer configures the UE with less than 2 CCs. If no, the eNB enters state 605: CA with large payload size mode or fallback mode. If fallback mode is triggered due to the detection of downlink scheduler for PCC only, then non-CA format 610 is used for uplink HARQ feedback; otherwise, CA with large payload size mode is triggered and CA-L format 608 is used for uplink HARQ feedback. If at step 603, the eNB finds that there are less than two CC configured for the UE, the HARQ mode for the UE further depends on other configuration information from the upper layer. In one embodiment of the invention, the eNB checks whether the UE is configured with CA-S format at step 604. If CA-S format is configured for the UE, the eNB will enter state 606: CA with small payload size mode or fallback mode. If fallback mode is triggered due to the detection of downlink scheduler for PCC only, then non-CA format 610 is used for uplink HARQ feedback; otherwise, CA with small payload size mode is triggered and CA-S format 609 is used for uplink HARQ feedback. On the other hand, if CA-L format is configured for the UE in step 604, eNB enters state 605: CA with large payload size mode or fallback mode. If fallback mode is triggered due to the detection of downlink scheduler for PCC only, then non-CA format 610 is used for uplink HARQ feedback; otherwise, CA with large payload size mode is triggered and CA-L format 608 is used for uplink HARQ feedback.

Figure 7:
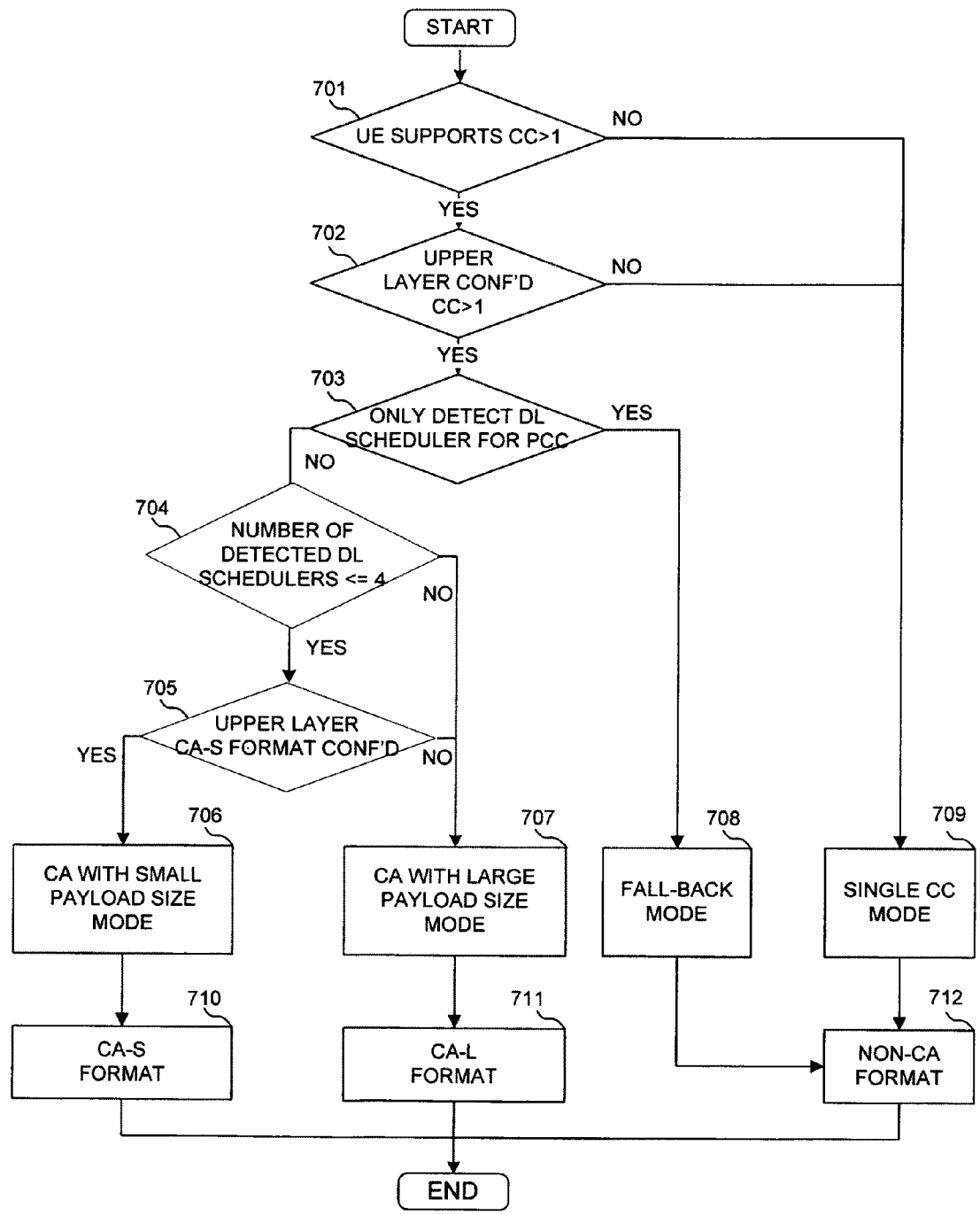
FIG. 7 illustrates a specific UE implementation to solve the uplink HARQ format switching problem.

FIG. 7 shows one embodiment of UE implementation of the algorithm in FIG. 5 in TDD system. In the example of FIG. 7, a UE can decide the HARQ format based on the information in Step 522 in FIG. 5 by first categorizing the HARQ format mode. As shown in FIG. 7, at step 701, the UE first considers the capacity of maximum number of CC supported by this UE. If the UE can only support one CC, then, the UE's HARQ feedback format is a single CC mode 709. UE should use non-CA format 712 for uplink HARQ feedback on PUCCH. If step 701 determines that the UE has the capability of supporting more than one CC, the UE then looks at its upper layer configuration to decide if more than one CC has been configured at step 702. If there is only one CC configured by the upper layer, even though the UE can support more than one CC, the UE still goes to single CC mode 709 and uses non-CA format 712. On the other hand, if step 702 determines that more than one CCs have been configured for this UE, then the decision of which HARQ format mode to use will further depends on the detection of DL scheduler at step 703. If the UE only detects DL scheduler for Primary Component Carrier (PCC), the UE will set its HARQ format to fallback mode 708. If the UE is in the fallback mode for uplink HARQ feedback, non-CA HARQ feedback format 712 should be used for uplink HARQ feedback information.

If at step 703, there is at least one DL scheduler for Secondary Component Carrier (SCC), then the UE goes to step 704. If at step 704, there are less than or equal to four DL schedulers detected, then based on the upper layer configuration, the UE will be set to either CA with small payload size mode 706 or CA with large payload size mode 707. In one embodiment, at step 705, the UE will check if the CA-S format is configured by the upper layer RRC for uplink HARQ feedback. If CA-S format is configured for this UE, then the UE is set to CA with small payload size mode 706, and uses CA-S HARQ feedback format 710. Otherwise, the UE is set to CA with large payload size mode 707, and uses CA-L HARQ feedback format 711. If at step 704, there are more than four DL schedulers detected, then the UE is set to CA with large payload size mode 707, and uses CA-L HARQ feedback format 711.

FIG. 6 and FIG. 7 show exemplary implementations based on FIG. 5 methods to solve the HARQ format-switching problem. By considering the combination of UE's maximum CC capacity, the upper layer CC configuration information, and the detection results of DL schedulers, UE has less risk exposure to the unreliable lower layer control channel. It makes the format switching more efficient.

Resource Allocation

Another issue relating to the uplink HARQ in a LTE-Advance system is resource allocation for HARQ feedback channel. The existing non-CA based system uses implicit resource allocation based on the logical address of the downlink scheduler. Such implicit method does not work in a CA-enabled system. This is because multiple DL component carriers can be supported with only one UL component carrier. As a result, there may be only one HARQ feedback channel on a specific UL component carrier for multiple scheduled transport blocks in more than one DL component carriers. In addition, due to unreliable decoding results of downlink scheduler, eNB does not know which physical resource UE will apply for the HARQ feedback. Problems may occur with resource allocation when some of the control messages are lost due to the unreliable wireless channel. For example, an eNB sends three DL grants: G1, G2, and G3 to an UE. The eNB not knowing which resource the UE would choose, and will have to reserve all the possible physical resources. This is not an efficient way for HARQ uplink resource allocation. A more efficient resource allocation scheme is thus needed.

Figure 8A:
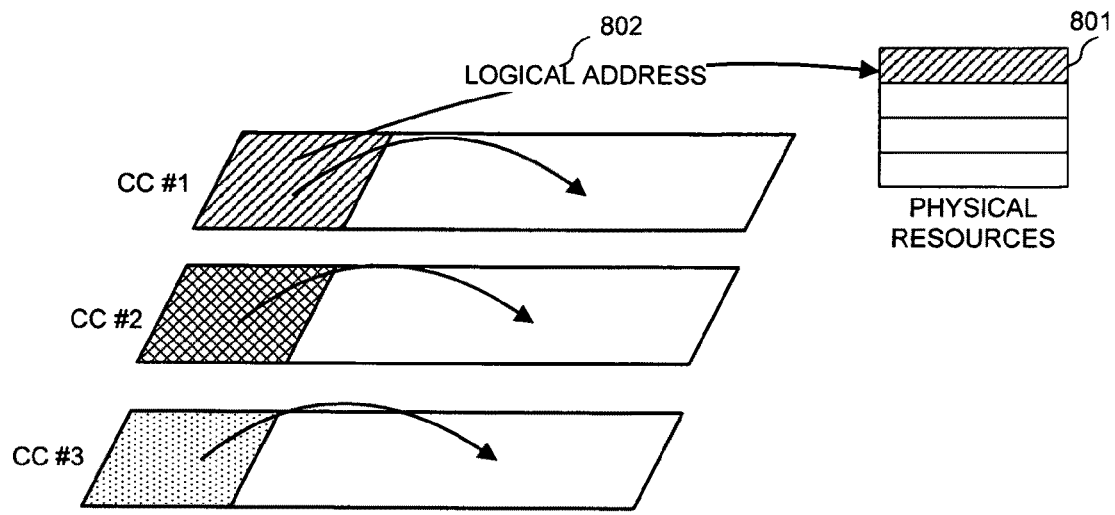
FIG. 8A illustrates an implicit resource allocation scheme for non-cross-CC scheduling.
Figure 8B:
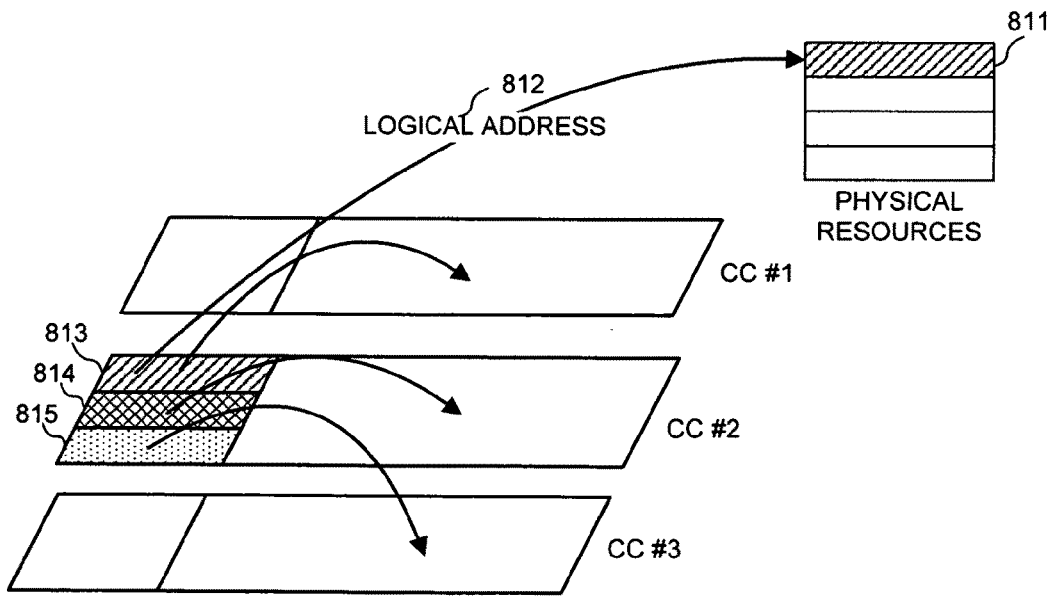
FIG. 8B illustrates an implicit resource allocation scheme for cross-CC scheduling.

Furthermore, the non-CA based implicit resource allocation scheme cannot be used in a CA-enabled system, especially when multiple DL component carriers are configured with only one UL component carrier. The implicit resource allocation scheme determines the uplink ACK/NACK (A/N) physical resources implicitly based on the logical address of downlink scheduling grant corresponding to the transport blocks over downlink PCC. FIG. 8A and FIG. 8B illustrate examples of the implicit resource allocation scheme.

FIG. 8A shows an implicit resource allocation with a non-cross-CC scheduling scheme. There are three CCs used for the UE. Each of the three CCs has its own control field that points to its TB. In a non-CA mode, the physical resource for uplink A/N feedback is implicitly allocated using the logical address 802 from the downlink-scheduling grant. This logical address points to a physical resource 801, which is the physical resource for uplink A/N feedback.

FIG. 8B shows an implicit resource allocation with a cross-CC scheduling scheme. Three CCs (CC #1, CC #2 and CC #3) are used for the UE. CC #2 has three control fields that schedule the three CCs. Control field 813 points to CC #1, control field 814 points to CC #2, and control field 815 points to CC #3. In a non-CA mode, the physical resource is implicitly allocated using the logical address 812 from the downlink-scheduling grant. This logical address points to a physical resource 811, which is the physical resource for uplink A/N feedback.

Figure 9:
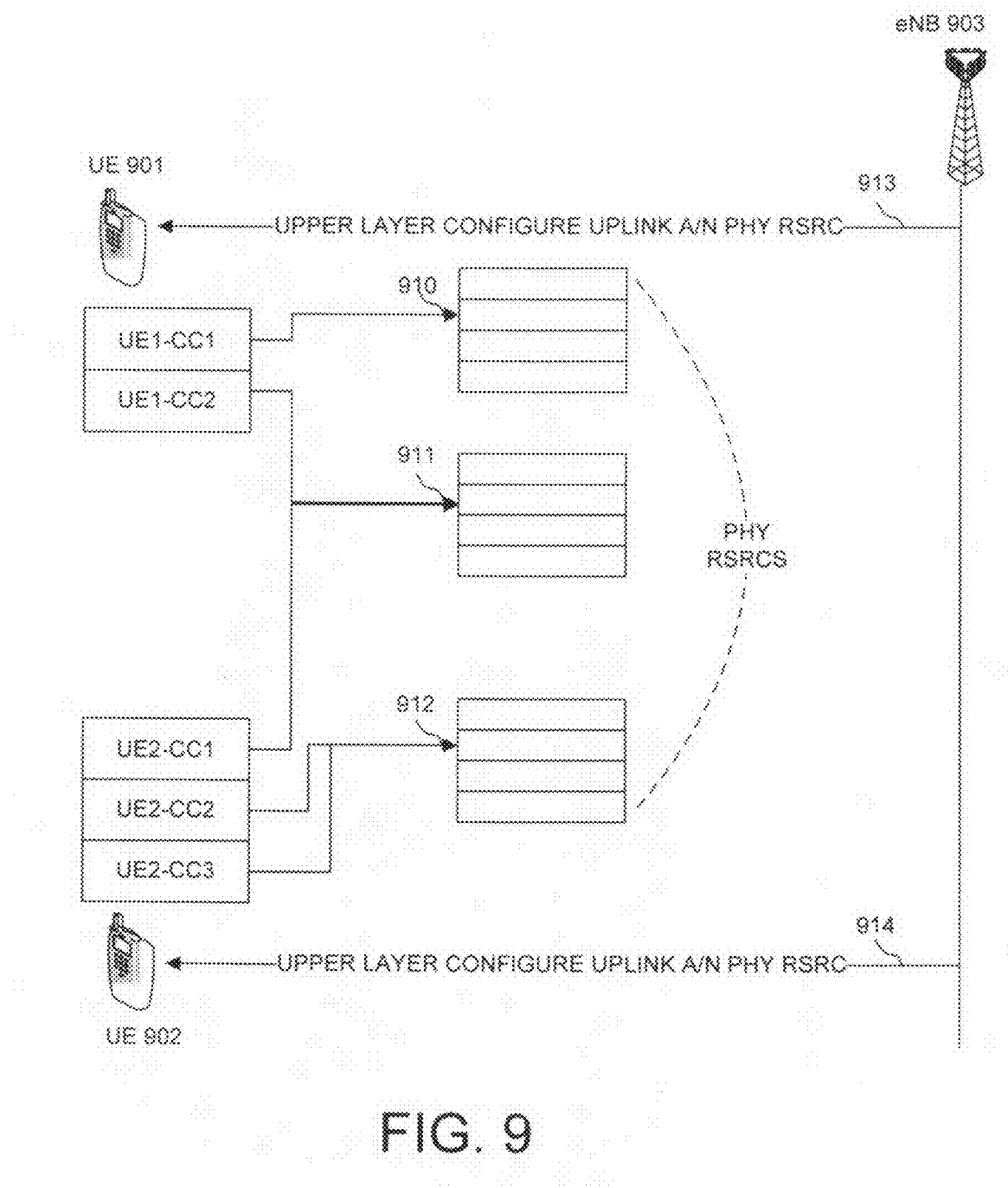
FIG. 9 illustrates a resource pool allocation managed by upper layer control.

Another type of uplink A/N physical resource allocation method is illustrated in FIG. 9 where an upper layer channel, such as RRC, configures multiple sets of physical resource for uplink A/N feedback. A set of uplink A/N physical resources are reserved for each configured CC by an upper layer channel. For example, if there are two CCs configured, two sets of uplink A/N physical resources are reserved. Different sets of uplink A/N physical resource can be the same. In addition, multiple UEs can share the same set of uplink A/N physical resource in each configured CC.

FIG. 9 illustrates this resource allocation managed by upper layer control. eNB 903 configures CC and A/N physical resources via an upper layer such as RRC signaling. At step 913, eNB 903 sends CC configuration and uplink A/N physical resource configuration information to UE 901. At step 914, eNB 903 sends CC configuration and uplink A/N physical resource configuration information to UE 902. For UE 901, two CCs, UE1-CC1 and UE1-CC2, are configured. Two separate sets of uplink A/N physical resource pool 910 and 911 are reserved for UE1-CC1 and UE1-CC2 respectively. UE1-CC1 points to 910 and UE-CC2 points to 911. Similarly, UE 902 is configured with three CCs: UE2-CC1, UE2-CC2 and UE2-CC3. Two sets of physical uplink A/N resource pool, 911 and 912, are reserved for UE 902. UE2-CC1 points to uplink A/N resource 911, which is shared with a different UE, UE 901. UE2-CC2 and UE2-CC3 both point to uplink A/N resource 912, where they share the same physical uplink A/N resource.

Figure 10:
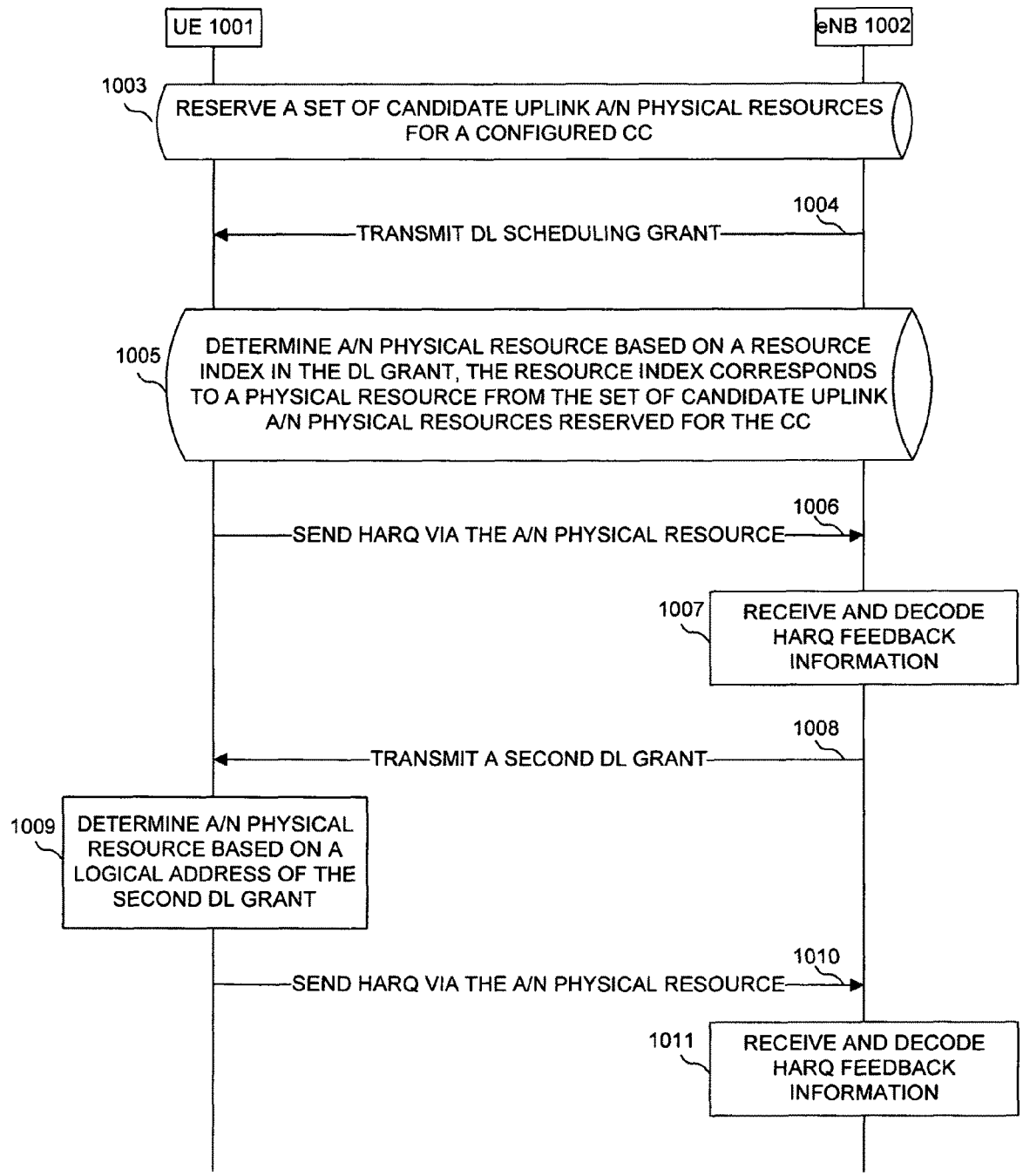
FIG. 10 illustrates a method of HARQ resource allocation in accordance with one novel aspect.

FIG. 10 illustrates a method of HARQ resource allocation in accordance with one novel aspect. In step 1003, eNB1002 reserves a set of candidate uplink A/N physical resources for a configured CC for UE1001. In step 1004, eNB1002 transmits a DL scheduling grant to UE1001. The DL grant corresponds to transport blocks over the configured CC. In step 1005, UE1001 receives the DL scheduling grant and determines an A/N physical resource. The A/N physical resource is determined based on a resource index in the DL grant. The resource index corresponds to a physical resource from the set of candidate uplink A/N physical resources reserved for the CC. If the DL transmission mode is configured as dual-codeword, then a second A/N physical resource is determined by applying an offset to the resource index. In step 1006, UE1001 sends HARQ feedback information via the determined A/N physical resource(s). In step 1007, eNB1002 receives and decodes the HARQ feedback information from the A/N physical resource(s). In step 1008, eNB1002 transmits a second DL scheduling grant to UE1001. In step 1009, UE1001 determines one or two A/N physical resources based on a logical address of the second DL scheduling grant. In step 1010, UE1001 sends HARQ feedback information via the one or two A/N physical resources. Finally, in step 1011, eNB1002 receives and decodes the HARQ feedback information from the one or two A/N physical resources.

There are two types of DL grants discussed in resource allocation methods: 1) Dynamic DL scheduling grant, and 2) Semi-persistent Scheduling (SPS) grant. The non-SPS DL Scheduling grant requires that every DL or UL physical resource block (PRB) allocation must be granted via an access grant message and grant expires automatically in one transmission time interval (TTI). The SPS introduces a semi-persistent PRB allocation that a user should expect on the DL or can transmit on the UL. An SPS grant will not expire automatically in one TTI. Instead, it will be terminated explicitly.

In one embodiment of the invention, a dynamic scheduling method is used for resource allocation of CA-S format. In this method, at most two uplink A/N physical resources are determined implicitly based on the logical address of downlink scheduling grant corresponding to the transport blocks over downlink PCC. The implicit logic address scheme is as shown in FIGS. 8A-8B. If the downlink-scheduling grant for PCC is configured as single codeword, only one uplink A/N physical resource is determined implicitly based on one logical address of downlink scheduling grant. If the downlink-scheduling grant for PCC is configured as dual codeword, two uplink A/N physical resources are determined implicitly based on one logical address of downlink scheduling grant. The remaining required uplink A/N physical resources are determined explicitly by the downlink scheduling grants corresponding to the transport blocks over downlink SCCs. This method can be applied for both cross-CC and non-cross-CC scheduling. It also applies for both FDD and TDD.

Figure 11:
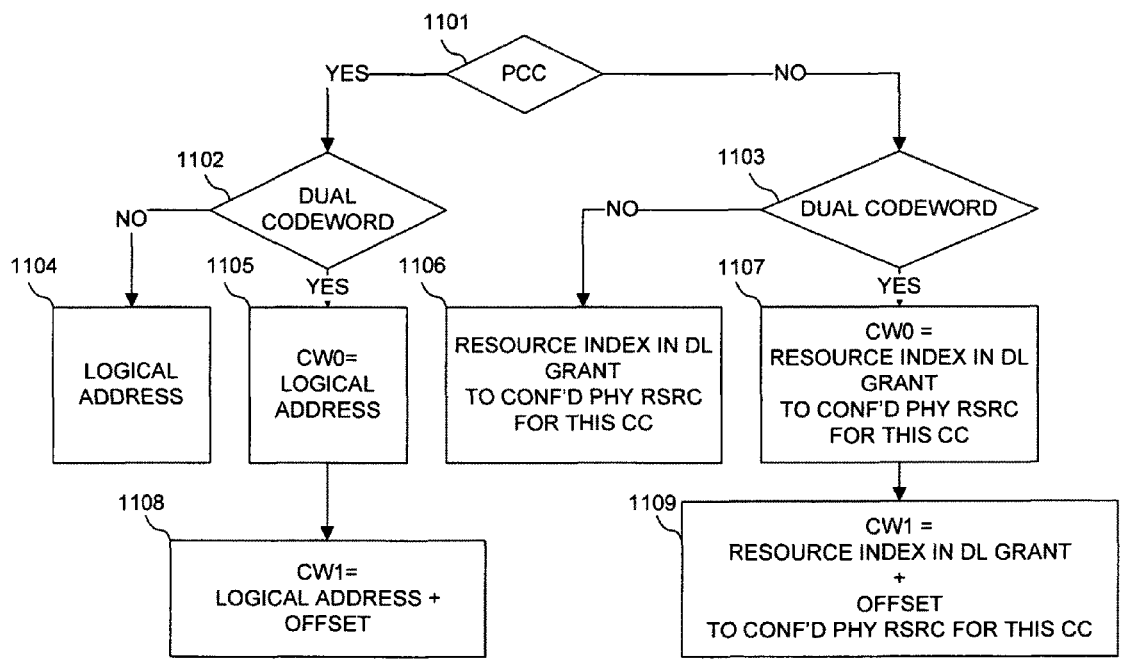
FIG. 11 shows the implementation steps of a dynamic resource allocation method.

FIG. 11 illustrates the implementation of the dynamic scheduling method. At step 1101, UE first checks if it is for PCC. If yes, at step 1102, it checks whether the PCC is configured as dual codeword. If it is not dual codeword, it goes to step 1104 and determines implicitly based on the logical address of downlink scheduling grant corresponding to the transport blocks over the downlink PCC. On the other hand, if at step 1102 it determines that it is dual codeword, it goes to steps 1105 and 1108, where two uplink A/N resources are determined implicitly based on one logical address of downlink scheduling grant at step 1105, and another one is determined by applying the logical address plus an offset. If at step 1101, UE determines it is not PCC, then the scheme moves on to step 1103 to check whether the SCC is dual codeword. If at step 1103 it determines it is not dual codeword, at step 1106, the required uplink A/N physical resources are determined explicitly by the downlink scheduling grants corresponding to the transport blocks over downlink SCCs. The physical resource for this SCC will be first determined by the set of physical resource configured by upper layer as shown in FIG. 10. A resource index in downlink scheduling grant is applied to determine which candidate uplink A/N physical resource is used for the A/N feedback in the reserved physical resource pool. If step 1103 determines it is dual codeword, then it moves to steps 1107 and 1109. Step 1107 is the same as 1106 and it gets the physical resource for codeword 1. A second candidate uplink A/N physical resource is determined by applying an offset to the resource index at step 1109. The resource index plus the offset index is used to determine which candidate uplink A/N physical resource is used for the A/N feedback in the reserved physical resource pool.

Figure 12:
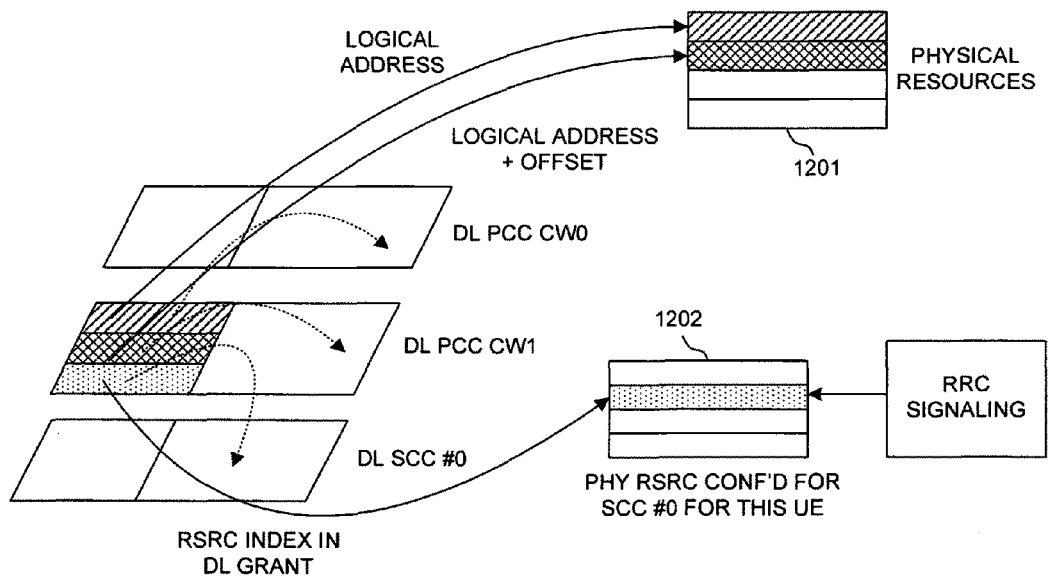
FIG. 12 illustrates a specific example of a dynamic resource allocation method.

FIG. 12 further illustrates the dynamic resource allocation method. As shown in FIG. 12, DL PCC codeword 1 has control field containing scheduling for DL PCC codeword 0, DL PCC codeword 1, and SCC #0. Using this method, the uplink A/N physical resource for DL PCC codeword 0 is determined implicitly based on the logical address in physical resource 1201 of downlink scheduling grant for DL PCC. Because the DL PCC is dual codeword, the uplink A/N physical resource for DL PCC codeword 1 is determined based on the logical address for DL PCC codeword 0 plus an offset in the same physical resource 1201. The uplink A/N physical resource for the remaining DL SCC #0 is in the physical resource 1202 configured by the RRC signaling. The RRC configuration is as shown in FIG. 10. The resource index in the downlink grant scheduling for the SCC is used to determine which candidate from the physical resource 1202 to use.

In another embodiment of this invention, a semi-persistent scheduling (SPS) is used for resource allocation. In this scheme, the required uplink A/N physical resources are determined explicitly by the downlink SPS activation grants corresponding to the SPS transport blocks over CCs. A set of physical resource is configured by upper layer signal with methods shown in FIG. 10. A resource index in SPS activation grant is applied to determine which candidate uplink A/N physical resource is used for the A/N feedback. If the downlink-scheduling grant with dual-codeword transmission mode is applied for this CC, a second candidate uplink A/N physical resource is determined by applying an offset to the resource index. This method can be applied for both cross-CC and non-cross-CC scheduling. It can also be applied for both FDD and TDD.

Figure 13:
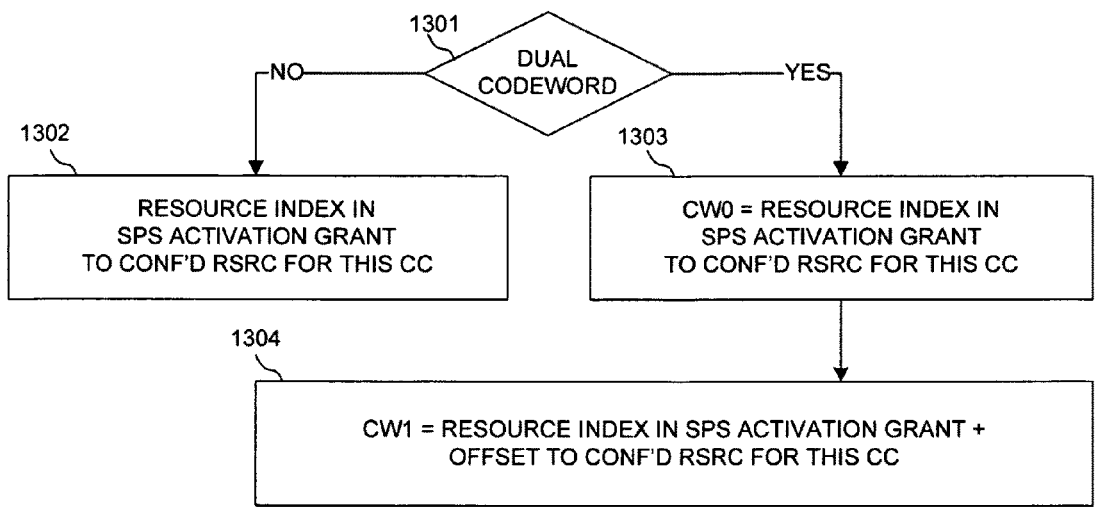
FIG. 13 shows the implementation steps of SPS resource allocation method.

FIG. 13 shows the steps for the SPS resource allocation method. At step 1301, it determines whether the DL scheduling grant with dual-codeword transmission mode is applied for this CC. If no, it moves to step 1302, where the resource index in SPS activation grant is used to determine which candidate uplink A/N physical resource for A/N feedback. The set of the physical resource is reserved by upper layer configuration as shown in FIG. 10. If at step 1301 it determines that dual-codeword applies to this CC, it moves to steps 1303 and 1304, where 1303 is the same as 1302 the candidate chosen applies to codeword 0 for the A/N feedback. At step 1304, a second candidate uplink A/N physical resource is determined from the same physical resource by applying an offset to the SPS resource index.

Figure 14:
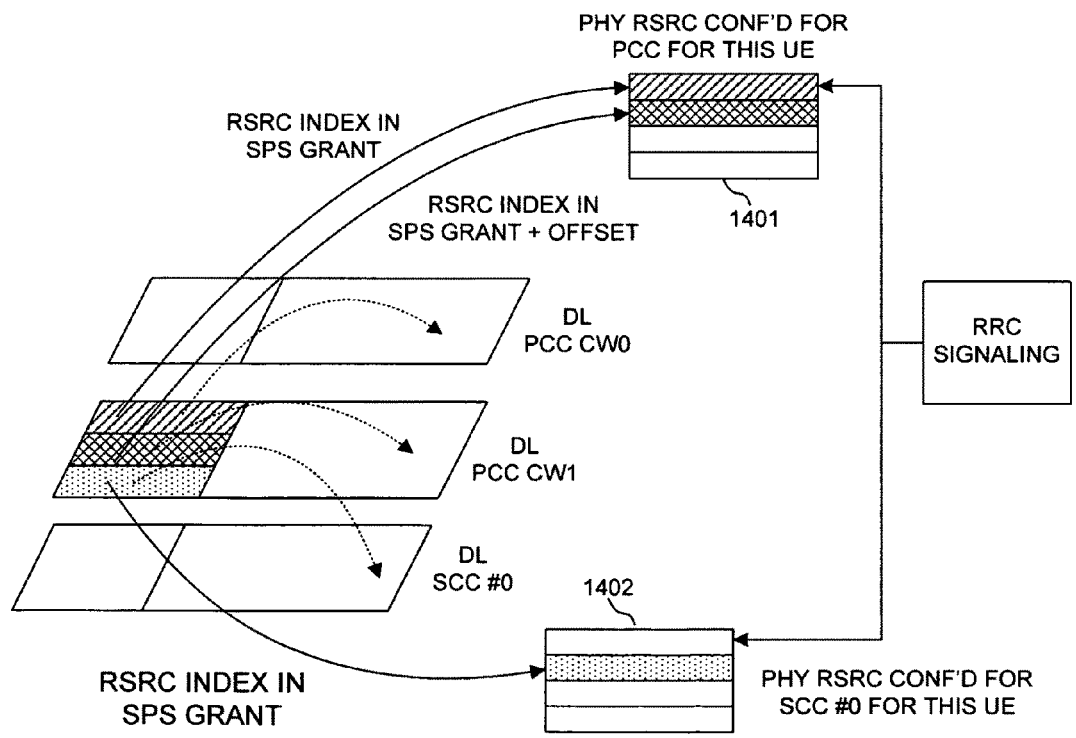
FIG. 14 illustrates a specific example of SPS resource allocation method.

FIG. 14 further illustrates the SPS resource allocation method. As shown in FIG. 14, three CCs are received at the UE. The DL PCC is configured as dual-codeword and DL SCC #0 is not configured as dual-codeword. Physical resource 1401 is reserved for PCC via RRC signaling using the method shown in FIG. 10. Physical resource 1402 is reserved via RRC signaling for SCC #0 using the method shown in FIG. 10. The uplink A/N physical resource for DL PCC codeword 0 is determined by using the resource index in the SPS grant to pick from the physical resource 1401. The uplink A/N physical resource for DL PCC codeword 1 is determined by using the resource index in the SPS grant plus an offset to pick from the physical resource 1401. The uplink A/N physical resource for SCC #0 is determined by using the resource index in the SPS grant to pick from the physical resource 1402.

Figure 15:
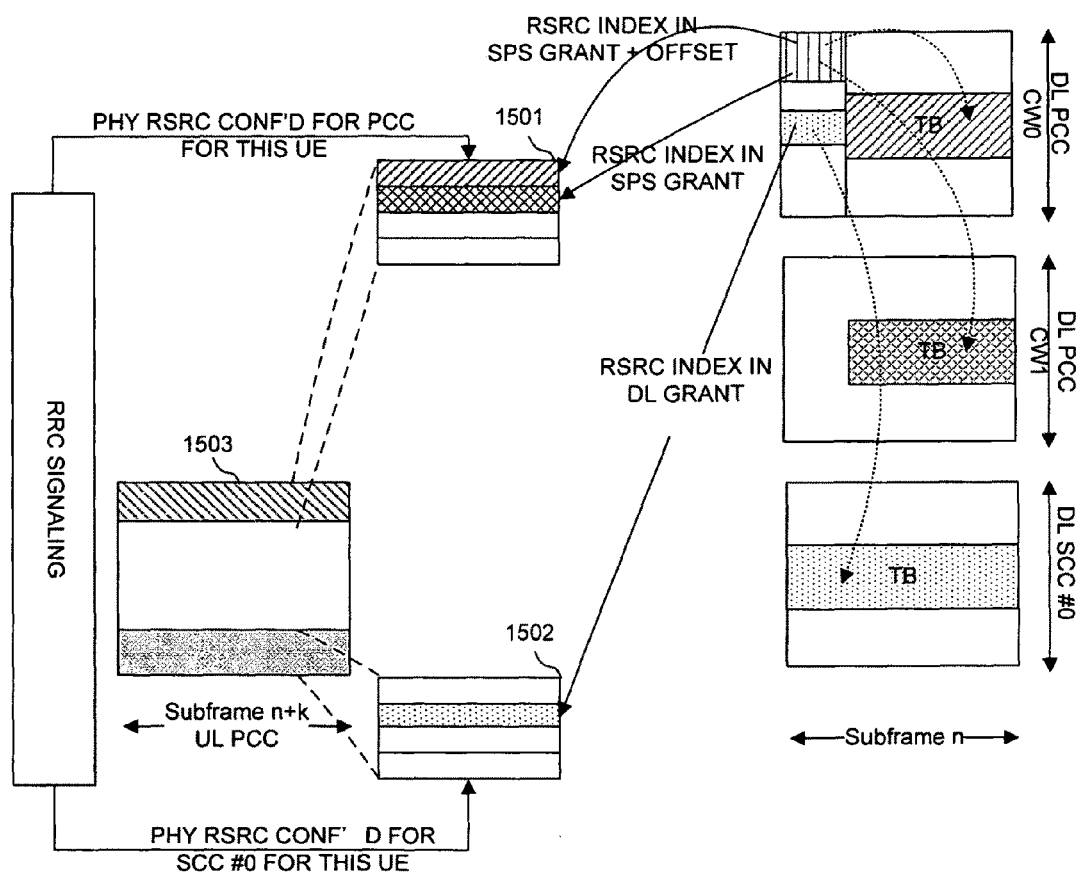
FIG. 15 illustrates a specific example of a hybrid resource allocation method.

In other embodiments, hybrid methods can be used for resource allocation of CA-S format. In one embodiment, the required uplink A/N physical resources are determined based on dynamic resource allocation scheme. The remaining required uplink A/N physical resources are determined based on SPS resource allocation. In another embodiment, a hybrid method can be used by applying SPS resource allocation method for PCC and use dynamic resource allocation for the others. FIG. 15 illustrates such a method. All these hybrid methods can be applied for both cross-CC and non-cross-CC scheduling. They can be applied for both FDD and TDD as well.

FIG. 15 illustrates a hybrid resource allocation method where SPS resource allocation is used for PCC and dynamic resource allocation is used for the rest of the resource. FIG. 15 shows a cross-CC scheduling with three CCs at subframe n: downlink primary component carrier codeword 0 (DL PCC CW0), downlink primary carrier component carrier codeword 1 (DL PCC CW1), and downlink secondary component carrier #0 (DL SCC #0). DL PCC CW0 has the control scheduling fields for all three carriers. A set of uplink A/N physical resource pool 1501 is configured for PCC by upper layer via RRC signaling. A set of uplink A/N physical resource pool 1502 is configured for SCC #0 by upper layer via RRC signaling. The resource index in SPS activation grant for PCC is applied to determine which candidate uplink A/N physical resource in 1501 is used for A/N feedback. A second candidate for PCC is determined by applying an offset to the SPS resource index in PCC to determine which candidate uplink A/N physical resource in 1501 is used for A/N feedback. The resource index in DL grant for SCC #0 is applied to determine which uplink A/N physical resource is used in the physical resource pool 1502. The physical resources for A/N feedback are packaged onto an UL PCC at subframe n+k. Other combination of hybrid methods may also be used to provide an efficient uplink A/N physical resource allocation.

Although the present invention has been described in connection with certain specific embodiments for instructional purposes, the present invention is not limited thereto. For example, although an LTE-advanced mobile communication system is exemplified to describe the present invention, the present invention can be similarly applied to all carrier aggregation-based mobile communication systems. Accordingly, various modifications, adaptations, and combinations of various features of the described embodiments can be practiced without departing from the scope of the invention as set forth in the claims.

What is claimed is:

1. A method comprising:
transmitting a downlink (DL) scheduling grant to a UE in a multi-carrier mobile communication network by an eNB, wherein the DL scheduling grant corresponds to transport blocks over a component carrier (CC);
reserving a set of candidate uplink acknowledgement or negative acknowledgement (A/N) physical resources for the CC; and
receiving and decoding HARQ feedback information from a first A/N physical resource that is determined based on a resource index contained in the DL scheduling grant, wherein the resource index corresponds to the physical resource from the set of candidate uplink A/N physical resources, and wherein the eNB also decodes the HARQ feedback information from a second A/N physical resource that is determined by applying an offset to the resource index if a DL transmission mode is configured as dual-codeword.

2. The method of claim 1, wherein the DL scheduling grant is a semi-persistent scheduling (SPS) activation grant, wherein the grant is valid for multiple subframes.

3. The method of claim 1, further comprising:
transmitting a second DL scheduling grant, wherein the second DL scheduling grant corresponds to transport blocks over a primary CC (PCC); and
receiving the HARQ feedback information from one or two A/N physical resources determined based on a logical address of the second DL scheduling grant.

4. The method of claim 1, wherein different sets of candidate uplink A/N physical resources are reserved for different configured CCs by an upper radio resource configuration (RRC) layer.

5. The method of claim 4, wherein the same set of candidate uplink A/N physical resources is shared by multiple UEs in each configured CC.

6. A base station, comprising:
a Physical (PHY) or Media Access Control (MAC) layer module that transmits a downlink (DL) scheduling grant to a UE in a multi-carrier mobile communication network, wherein the DL scheduling grant corresponds to transport blocks over a component carrier (CC);
a Radio Resource Control (RRC) layer module that reserves a set of candidate uplink negative acknowledgement (A/N) physical resources for the CC; and
an antenna that receives HARQ feedback information, wherein the PHY layer module decodes the HARQ feedback information from a first A/N physical resource that is determined based on a resource index contained in the DL scheduling grant, and wherein the resource index corresponds to the physical resource from the set of candidate uplink A/N physical resources, and wherein the PHY layer module also decodes the HARQ feedback information from a second A/N physical resource that is determined by applying an offset to the resource index if a DL transmission mode is configured as dual-codeword.

7. The base station of claim 6, wherein the DL scheduling grant is a semi-persistent scheduling (SPS) activation grant, wherein the grant is valid for multiple subframes.

8. The base station of claim 6, wherein the PHY or MAC layer module transmits a second DL scheduling grant corresponds to transport blocks over a primary CC (PCC), and wherein the PHY layer module decodes the HARQ feedback information from one or two A/N physical resources determined based on a logical address of the second DL scheduling grant.

9. The base station of claim 6, wherein different sets of candidate uplink A/N physical resources are reserved for different configured CCs by an upper radio resource configuration (RRC) layer.

10. The base station of claim 9, wherein the same set of candidate uplink A/N physical resources is shared by multiple UEs in each configured CC.

11. A method comprising:
receiving a downlink (DL) scheduling grant from an eNB in a multi-carrier mobile communication network, wherein the DL scheduling grant corresponds to transport blocks over a component carrier (CC);
determining a first acknowledgement or negative acknowledgement (A/N) physical resource based on a resource index contained in the DL scheduling grant, wherein the resource index corresponds to a physical resource from a set of candidate uplink A/N physical resources reserved for the CC;
determining a second A/N physical resource by applying an offset to the resource index if a DL transmission mode is configured as dual-codeword; and
transmitting HARQ feedback information allocated in the determined first and second A/N physical resource.

12. The method of claim 11, wherein the DL scheduling grant is a semi-persistent scheduling (SPS) activation grant, wherein the grant is valid for multiple subframes.

13. The method of claim 11, further comprising:
receiving a second DL scheduling grant, wherein the second DL scheduling grant corresponds to transport blocks over a primary CC (PCC); and
determining one or two A/N physical resources based on a logical address of the second DL scheduling grant.

14. The method of claim 11, wherein different sets of candidate uplink A/N physical resources are reserved for different configured CCs by an upper radio resource configuration (RRC) layer.

15. The method of claim 14, wherein multiple UEs share one set of candidate uplink A/N physical resources in each configured CC.

16. A User Equipment (UE), comprising:
a Physical (PHY) or Media Access Control (MAC) layer module that receives a downlink (DL) scheduling grant from an eNB in a multi-carrier mobile communication network, wherein the DL scheduling grant corresponds to transport blocks over a component carrier (CC);
a Radio Resource Control (RRC) layer module that determines a first acknowledgement or negative acknowledgement (A/N) physical resource based on a resource index contained in the DL scheduling grant, wherein the resource index corresponds to a physical resource from a set of candidate uplink A/N physical resources reserved for the CC, and wherein the RRC layer module determines a second A/N physical resource by applying an offset to the resource index if a DL transmission mode is configured as dual-codeword; and
an antenna that transmits HARQ feedback information allocated in the determined first and second A/N physical resource.

17. The UE of claim 16, wherein the DL scheduling grant is a semi-persistent scheduling (SPS) activation grant, wherein the grant is valid for multiple subframes.

18. The UE of claim 16, wherein the PHY or MAC layer module receives a second DL scheduling grant corresponds to transport blocks over a primary CC (PCC), and wherein one or two A/N physical resources are determined based on a logical address of the second DL scheduling grant.

19. The UE of claim 16, wherein different sets of candidate uplink A/N physical resources are reserved for different configured CCs by an upper radio resource configuration (RRC) layer.

20. The UE of claim 19, wherein multiple UEs share one set of candidate uplink A/N physical resources in each configured CC.

* * * * *